April 16, 1974      H. C. H. DARLEY      3,804,760
WELL COMPLETION AND WORKOVER FLUID
Filed Aug. 27, 1971      2 Sheets-Sheet 1

United States Patent Office 3,804,760
Patented Apr. 16, 1974

3,804,760
WELL COMPLETION AND WORKOVER FLUID
Henry C. H. Darley, Houston, Tex., assignor to Shell Oil Company, Houston, Tex.
Continuation-in-part of abandoned application Ser. No. 884,819, Dec. 2, 1969. This application Aug. 27, 1971, Ser. No. 175,690
Int. Cl. B01j 13/00; E21b 43/00
U.S. Cl. 252—8.55 R          3 Claims

ABSTRACT OF THE DISCLOSURE

A particle-stabilized water-in-oil emulsion that contains sufficient fine, acid-soluble, oil-wet particles to stabilize the emulsion while the particles are present and insufficient surfactant to stabilize the emulsion after those particles have been dissolved.

CROSS-REFERENCE TO CO-PENDING APPLICATION

This application is a continuation-in-part of application Ser. No. 884,819, filed Dec. 2, 1969, now abandoned.

BACKGROUND OF THE INVENTION

Field of the invention

The present invention relates to a well completion and workover fluid having a relatively high viscosity at the temperature of the borehole of a well for use in situations in which a temporary plugging of a permeable subsurface earth formation is effected, and, on subsequent treatment, is readily removed by covering the fluid to one of relatively low viscosity by contact with a second fluid without causing formation damage or swelling of clayey portions of the formation, or decreasing its susceptibility to consolidation treatment, or decreasing the permeability of the treated formation or its susceptibility to a fluid drive for oil recovery.

Description of the prior art

The completion and workover of oil and gas wells often require the plugging of perforations, screens and similar openings. In certain prior art processes, this can be done by injecting a plugging liquid into the well in a quantity sufficient to plug the perforations or other openings, and thereafter, restoring communication by injecting a solution adapted to dissolve the plugging material.

Proposed completion and workover fluids comprise oil-water emulsions or aqueous systems containing water or oil-soluble solids which are readily dissoluble in aqueous acidic or oil solvent solutions. Emulsion systems proposed in patents, such as U.S. Pats. 2,898,294 or 3,007,865 and aqueous solutions are described in U.S. Pats. 3,000,818; 3,272,741; 3,353,600 or 3,353,604. Generally, with systems as described in these patents, it has been found that they are difficult to handle, it requires a long time before their effectiveness is noted in respect to a restoration of permeability making them economically costly to use, they adversely affect the permeability of formations, they tend to plug perforations and portions of the formations and they are difficult to remove without causing damage to the formation and borehole on acid treatment.

SUMMARY OF THE INVENTION

It is an object of this invention to provide a composition for temporarily preventing fluid invasion into an earth formation without adversely affecting the permeability of the formation.

It is a further object of this invention to provide a formation plugging material which may be readily unplugged without causing damage to the earth formation or requiring a lowering of the pressure in the borehole to less than that in the formation in order to induce a backflow.

It is still a further object of this invention to provide a method of forming a formation plugging material which may be readily unplugged without causing damage to the earth formation.

These objects are preferably accomplished by dispersing a water-phase liquid in an oil-phase liquid and mixing the resultant dispersion with an amount of selectively oil-wet, fine, acid-soluble solid particles sufficient to form an emulsion which is stable at the temperature of the earth formation only as long as the solid particles are present in their solid state.

While the acid-soluble particles are present, the present emulsions are water-oil emulsions which are stable in the sense of being capable of remaining quiescent at the temperature of the subterranean reservoir to be treated for at least about six hours with little separation of free oil-phase liquid (e.g., less than about 5% by volume of the amount present in the emulsion). These emulsions are also capable of separating into substantially undispersed oil-phase and water-phase liquids within about two hours after being contacted with sufficient acid to dissolve the acid-soluble particles. The stability of a water-in-oil emulsion amounts to the capability of the water droplets to resist coalescence and remain dispersed. The present emulsions are preferably capable of remaining stable only long enough to insure the completion of operations within a well, e.g., for at least about six hours, or the time required for a round trip of a pipe string such as a tubing string or a drill string. It is seldom necessary for the present emulsions to remain stable for more than a few days or a week.

In the present emulsions, the stability is effected by:

(1) The proportions of oil-phase and water-phase liquid, with the stability increasing with increasing proportions of oil-phase liquid;

(2) The concentration of surfactant materials, with the stability increasing primarily with increasing concentrations of cationic interfacial tension lowering surfactant, but also increasing to some extent with increasing concentration of oil-wetting surfactant;

(3) The salinity of the water-phase liquid, with the stability decreasing with increasing concentration of dissolved salts of divalent metals; and (4) Various contaminants encountered in well-treating operations.

It is important that the types and proportions of the emulsion components be correlated with respect to the above factors so that the present emulsions remain water-in-oil emulsions (rather than becoming oil-in-water emulsions) and satisfy the specified quiescent stability (when all components are present) and relatively rapid breaking after acidization (when the acid-soluble particles are dissolved). In this respect the present emulsions are distinctly different from the water-in-oil emulsions that are utilized as oil-based and/or invert-emulsion drilling fluids. Such oil-base drilling fluids sometimes contain similar components—oil, water, surfactants and acid-soluble solid particles. But, such oil-base drilling fluids contain an amount of interfacial tension lowering surfactant that is sufficient to insure that the emulsion will remain stable whether or not the solid particles are present—generally an amount in order of 10–20 pounds of surfactant per barrel of the drilling fluid. In contrast, in the present emulsion, the total amount of surfactants is generally less than about ½ pound of surfactant per barrel of the emulsion.

In the present water-in-oil emulsions, the oil-phase component can comprise substantially any substantially solid-free oil-phase liquid having a suitable viscosity at the temperature of the reservoir to be treated. Examples of suitable oil-phase liquids include kerosene, diesel oil, fuel oil, lubricating oils, crude oils and the like. Where the viscosity of the oil-phase liquid is relatively high, the proportion of water-phase liquid can be kept relatively low level in order to maintain an emulsion viscosity as low as that of an emulsion containing a smaller proportion of a lighter oil. The relatively light oils, such as kerosene or diesel oil, are preferred for general use, with crude oil being preferred for wells in relatively inaccessible locations.

The water-phase liquid component in the present emulsions can comprise substantially any relatively soft and non-corrosive water-phase liquid which is substantially free of solids. Examples of suitable water-phase liquids include pure water, fresh water, aqueous solutions containing up to saturating amounts of neutral alkali metal salts, such as the sodium or potassium chlorides, or the like, aqueous solutions containing up to about one or two percent by weight of alkaline earth metal salts, such as calcium or magnesium chlorides, or the like. Relatively soft saline solutions are preferred, with the salinity being increased as desired in order to increase the density of the emulsion.

The acid-soluble particles used in the present emulsions can comprise substantially any relatively fine particles. Such particles preferably have diameters near or below about 2 microns, since the dispersed droplets of water-phase liquid tend to have diameters of about 5 microns, and it is essential that the acid-soluble particles be adsorbed or concentrated around the dispersed droplets of water-phase liquid. Such particles should be capable of being dissolved in an acid solution such as one normal hydrochloric acid and should be capable of being selectively oil-wetted so that they become adsorbed or concentrated along the oil-water interfaces around the droplets of the dispersed water-phase liquid. Examples of suitable acid-soluble particles include substantially any inorganic carbonate which is stable at the reservoir temperature, such as the alkaline earth metal carbonates and alkali metal carbonates; discretely particulate metal hydroxides, such as the alkaline metal earth hydroxides; relatively acid-soluble metal oxides, such as the ferric oxides, hematite and the like; metal particles such as iron, lead, and the like. In general, particles of acid-soluble inorganic materials, particularly the carbonate materials, are preferred, with the calcium carbonate, such as chalk, marble or the like being preferred for general application and barium carbonate being preferred where it is desirable for the emulsion to have a relatively high density.

In the present emulsions, the acid-soluble particles are selectively oil-wetted to an extent adapting them to become adsorbed or concentrated at the oil-water interfaces around the water-droplets in an amount causing the emulsion to exhibit the above described duration of quiescent stability and rate of breaking when contacted by acid. The suitability of a given acid-soluble material can be tested by means of the quiescent stability and rate of breaking after acidization of an emulsion that contains: particles of that material having a median diameter of about 2 microns in a proportion of from about 1½ to 5 pounds per barrel of total liquid; diesel oil from about 30 to 80% by volume of total liquid; tall oil from about ½ to 4% by volume of the diesel oil; and Redicote $E_{11}$ from about 0.1 to 1.5% by volume of total liquid. The acid-soluble particles which form emulsions that have a quiescent stability of at least about six hours at the reservoir temperature and break within about two hours after the particles are dissolved, are suitable.

The oil-wetting surfactant component of the present emulsions adjusts the oil-wetness of the acid-soluble particles. Such a surfactant can be substantially any oil-wetting surface active material that is adapted to increase the oil-wetness of solid particles such as calcium carbonate particles. Examples of suitable oil-wetting surfactants include: relatively high molecular weight, fatty acids, and/or the anhydrides, dimers, salts or the like of such fatty acids, e.g., oleic acid, linoleic acid, naphthenic, tall oil, tall oil fatty acids (e.g., tall oils commercially available as Actinol FA1, or FA2, etc., from the Arizona Chemical Company); relatively high molecular weight amine salts of relatively high molecular weight carboxylic acids, such as the diamine salts of fatty acids (e.g., such salts commercially available as Redicote TXO from Armour Industrial Chemicals), silicones such as dimethyl polysiloxane (e.g., SF–99 available from General Electric, Silicone Products Dept.), etc. The surface active fatty acids and fatty acid amine salts are preferred for general use. The suitability of a given oil-wetting surfactant can be tested by means of the quiescent stability and rate of breaking after acidization of an emulsion containing: about 1½ to 5 pounds per barrel of about 2 micron median diameter particles of calcium carbonate; diesel oil from about 30 to 80% by volume of total liquid; Redicote $E_{11}$ from about 0.1 to 1.5% by volume of total liquid and about ½ to about 4% of the diesel oil of the oil-wetting surfactant being tested. If the surfactant being tested is capable of providing an emulsion having a quiescent stability for at least about 6 hours at the reservoir temperature and breaking within about 2 hours after acidization, the surfactant is suitable.

An interfacial tension lowering surfactant is preferably included in the components of the present emulsion to enhance the ease of forming the emulsion and to increase its stability. Where none is used, the emulsion tends to be more difficult to mix, to break easily at elevated temperatures, and to resist remixing. On the other hand, if the ratio of interfacial tension lowering surfactant to oil-wetting surfactant becomes too high, the water-in-oil emulsion may revert to an oil-in-water emulsion. Between these two extremes there is for a given proportion of oil-wetting surfactant, a range of interfacial tension lowering surfactant concentrations in which the proper degree of stability and ease of mixing is obtained. The interfacial tension lowering surfactant can be substantially any cationic or non-ionic surfactant that is adapted to cause significant reductions in the interfacial tension between the oil-phase and water-phase liquids. Examples of suitable interfacial tension lowering surfactants include relatively high molecular weight mono- and polyamines and quaternary ammonium compounds in the form of their acid salts such as their hydrochlorides, such as the quaternary ammonium chloride commercially available, as Redicote $E_{11}$, from Armour Industrial Chemical Company; alkoxylated aliphatic and/or aromatic mono or diamines, such as the ethoxylated aliphatic diamines containing about 13 ethoxylate groups available, as Ethoduomeen T 13, from Armour Industrial Chemical Company; non-ionic surfactants such as the polyoxyethylene polyalcohols, e.g., those commercially available, as Aquet 277, from Aquaness Division, Milchem, Inc., etc. A cationic interfacial tension lowering surfactant is preferred.

In a preferred formulation, the emulsions provided by the present invention are dispersion of droplets at a water-phase liquid within an oil-phase liquid which exhibit a quiescent stability at the reservoir temperature of at least about six hours and break within about two hours when contacted with enough acid to dissolve the acid-soluble particles and contain the following components and proportions: oil-phase liquid, from about 30–80% by volume of the total liquid phase; oil-wetting surfactant, from about ½ to 4% by volume of the oil-phase liquid; interfacial tension lowering cationic surfactant, from about 0.1 to 1.5% by volume of the total liquid phase; and fine acid-soluble particles, from about ½ to 400 pounds per barrel of the total liquid phase.

In accordance with this invention, in temporarily plugging the face of an earth formation, the earth formation is contacted with the emulsion at a pressure exceeding the pressure of fluid present in the earth formation so as to form a substantially impermeable, emulsified filter cake on the surface of the earth formation. The filter cake is subsequently contacted with an acidic fluid capable of dissolving the emulsion-stabilizing solid particles so as to break down the emulsion and permit the fluid to invade the earth formation.

In displacing a material within a well with a fluid having a temporarily relatively high viscosity, the step of dissolving the acid-soluble emulsion-stabilizing solid particles is conducted so that, after a selected length of travel within the well conduit, the intermingling of the fluids causes the emulsion to break and form a mixture of liquid solutions having relatively low viscosities. Where the oil-phase components of the emulsion predominate in non-viscous hydrocarbons, such as diesel oil, the emulsions break to a mixture of an aqueous solution and a hydrocarbon solution which each have a viscosity substantially equal to the viscosity of water. Where desirable, an inert fluid, such as water, can be spotted between the emulsion and the acidic solution to adjust the distance along which the two fluids will travel through a well conduit before the emulsion is broken due to the reaction of the acidic solution with the acid-solution emulsion-stabilizing particles.

Formations thus treated may be effectively consolidated by the use of resinous materials, e.g., epoxy resins as described in U.S. Pats. Nos. 3,339,633; 3,368,625; and 3,368,626 and/or subjected to a drive fluid to effectively recover the oil from such treated formations. The drive fluids may contain surfactants, thickeners and mixtures thereof.

DESCRIPTION OF THE PREFERRED EMBODIMENT

Figure 1:
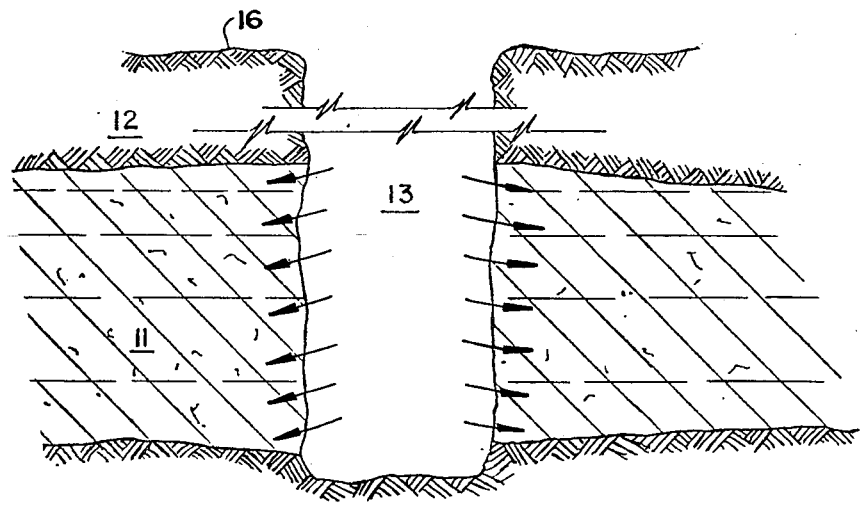
FIG. 1 is a vertical sectional view of a permeable formation prior to application of the teachings of this invention.

Referring to FIG. 1 of the drawing a porous subterranean earth formation, such as a permeable formation 11, is shown disposed below overburden 12. A well borehole 13 extends down into formation 11 to a point at least below the bottom of formation 11. As indicated by the arrows in FIG. 1, undesirable fluid invasion of formation 11 is taking place from borehole 13.

Figure 2:
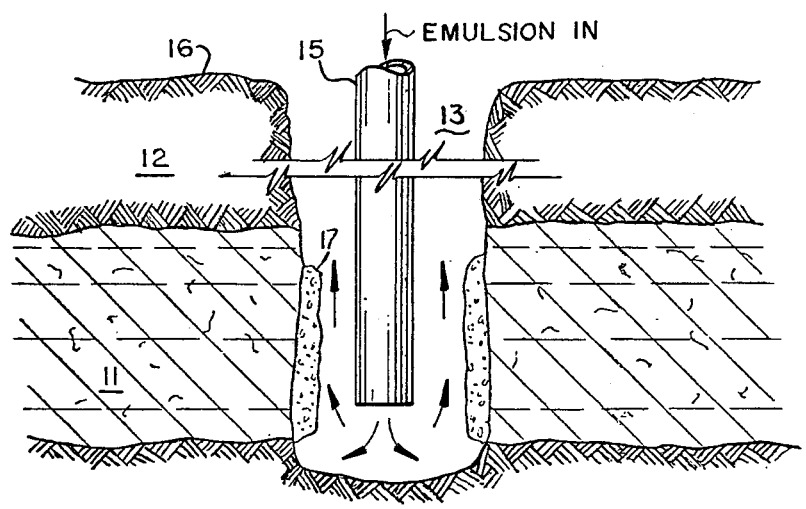
FIG. 2 is a vertical sectional view of the permeable formation of FIG. 1 treated in accordance with the teachings of this invention.
Figure 3:
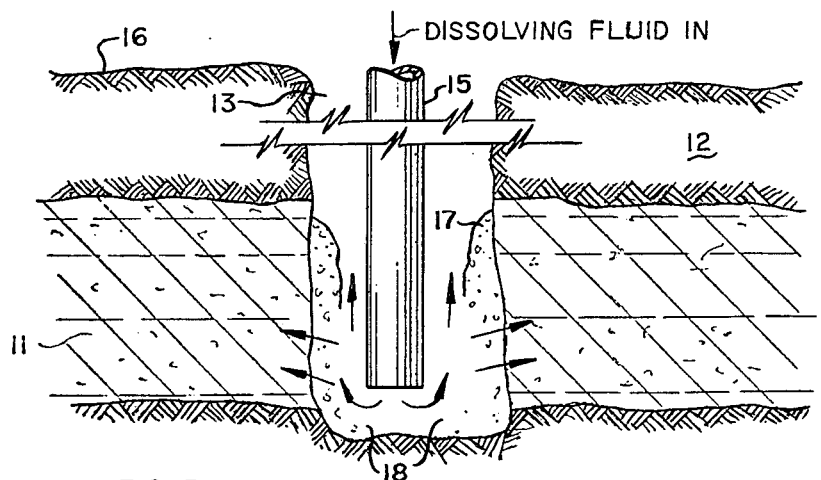
FIG. 3 is a vertical sectional view of the application of the teachings of this invention applied to the treated permeable formation of FIG. 2.

In accordance with the teachings of this invention, as illustrated in FIG. 2, a tubing string 15 is extended from the earth surface 16 and into communication with formation 11. An oil-water emulsion, formed in a manner to be discussed further herein below, is injected down tubing string 15 and into contact with the surfaces of formation 11 in communication with borehole 13 so as to form a substantially, impermeable, emulsified, filter cake 17 on the surface of formation 11, as illustrated in FIG. 2. If any injection into formation 11 occurs, it is only that due to a hydrostatic overbalance of the fluid pressure in the borehole 13 relative to that in formation 11. Subsequently, a fluid capable of dissolving the filter cake 17 is injected through tubing string 15 and into contact with filter cake 17. Thus, as illustrated in FIG. 3, the solid components of filter cake 17 are dissolved and the emulsion breaks to form a relatively non-viscous mixture of oil-phase and water-phase liquids. Fluids may again enter formation 11 as illustrated in FIG. 1.

The emulsion injected into borehole 13 is a water-in-oil emulsion stabilized by acid-soluble solid particles, such as chalk or marble. The emulsion is formed by dispersing a water-phase liquid into an oil-phase liquid and mixing the resultant dispersion with sufficient oil-wet, fine, acid-soluble, solid particles to form an emulsion which is stable at the temperature of formation 11 only as long as the solid particles are present. The emulsion contacts the surfaces of formation 11 at a pressure exceeding the pressure of the fluid within the formation 11 so as to form filter cake 17. The subsequent contacting of filter cake 17 by the dissolving fluid dissolves the emulsion-stabilizing solid particles so as to break down the emulsion and permit fluid to invade formation 11.

Preferably, the oil phase is diesel oil to which a small percentage of an oil-wetting surfactant such as tall oil is added. The emulsion may be formed by dispersing a water-phase liquid, such as a six percent by weight solution of sodium chloride in water, in the oil-phase liquid. The six percent sodium chloride water solution prevents swelling and dispersion of any water-sensitive clays that may be in the reservoir rocks of oil-shale formation 11. At this point, the fluid mixture is not yet emulsified. The mixture does not emulsify until the fine, solid particles are added. If desired, a small amount, as for example .1 to .2% by volume of the oil-phase liquid, of Redicote $E_{11}$, a cationic surfactant manufactured by the Armour Industrial Chemical Co. may be added to the oil-water mixture to promote dispersion of the water into the oil phase thus making the mixing easier and providing greater mechanical and thermal stability provided the proportion of Redicote $E_{11}$ is kept within a critical range. This range is narrow at low oil/water ratios. The addition of the Redicote $E_{11}$ results in excellent dynamic and static filtration properties. The rate of subsequent destablization of the filter cake 17 by the addition of the acid may be adjusted by varying the proportions of tall oil and Redicote $E_{11}$ in the emulsion.

The fine, solid particles are preferably finely-divided carbonate particles such as chalk. For example, a pure grade of calcium carbonate having a median particle size of about $2\mu$ may be used. However, mixtures of several size ranges of particles may be used to provide a continuous range from very fine to particles coarse enough to bridge the pores of formation 11 thus preventing the penetration of fluid into unconsolidated sands. Ground carbonates may also be added in large amounts to increase the density of the emulsions.

The following table is an example of exemplary properties of an emulsion prepared in accordance with the teachings of this invention as will be discussed further hereinbelow:

TABLE I

| | |
|---|---|
| Density | $7.3–10^{-4}$ lb./gal. |
| Plastic viscosity | 10–100 cp. |
| Yield point | 5–50 lb./100 ft.$^2$. |
| API filter loss | 3–6 cc./30 min., 73° F. |
| Dynamic filter loss on 2400 md. sandstone at 155°: | |
| Mud spurt | $<0.1$ cc./cm.$^2$ |
| Filtrate rate of 11 ft./sec., velocity | $12 \times 10^{-3}$ cc./cm.$^2$/min. |
| Filtrate rate at 3 ft./sec. mud velocity | $4 \times 10^{-3}$ cc./cm.$^2$/min. |
| Filtrate rate at static mud mud velocity | $1 \times 10^{-3}$ cc./cm.$^2$/min. |
| Filtrate | Oil. |
| Filtrate cake | Too thin to measure. |

Thermal stability for quiescent emulsions at 160° F. varied from six hours to >1 week, depending on the formulation.

When the particles, such as the chalk particles, are added to the water-in-oil and wetting agent mixture, the mixture emulsifies and an emulsion is formed. Thus, when acid is subsequently injected down tubing string 15 into contact with filter cake 17, the chalk is dissolved by the acid and immediate separation into two phases takes place. The small percentage of tall oil preferably added to the diesel oil brings the chalk to the desired degree of oil-wetness so that the particles are absorbed at the oil-water interfaces around the water droplets, thus stabilizing the emulsion.

A preferred grade of tall oil is Arizona Chemical Company's Acintol FA 1, a high quality, fractionated clear fluid containing 94 percent oleic and linoleic acid. The ratio of oil to water may be varied according to the viscosity desired. For example, in a preferred ratio, the oil content is from about 30 to 80 percent by volume of the total liquid phase. The diesel oil preferably contains between one and three percent tall oil; higher concentrations may give greater emulsion stability and lower filter loss. The optimum amount of chalk, such as carbonate powder, preferably lies between three and six pounds per barrel of oil and water. Larger amounts of chalk may further stabilize the emulsion.

In general, the order of mixing the components such as oil, water, and chalk is important. Preferably: (1) the acid soluble particles, such as chalk, and the oil-wetting surfactant, such as tall oil, are added to the oil-phase liquid, such as diesel oil; (2) an interfacial tension lowering surfactant, such as Redicote $E_{11}$, is added to a water-phase liquid, such as brine; and (3) such oil-phase and water-phase liquids are then mixed together. The chalk may be added after the oil, water, and surfactants have been mixed but oil and water must be agitated violently while the chalk is being added in order to form the emulsion. In certain of the formulations, particularly those which do not contain an effective amount of interfacial tension lowering surfactant, if the chalk is added first to either the oil or the water phase, the chalk may be wet by, and remain in that phase, and no emulsion will be formed.

The following Table II exemplifies key properties of typical emulsions of the present invention. In the table, the No. 10 White of emulsion No. 5 is a ground marble manufactured by the Georgia Marble Company of Tate, Ga., having a median particle size $17\mu$. The Micro and Fine grade Sluggits (8 Micro S1 and Fine S1), are ground marble manufactured by the Chemical Additives Company of Houston, Tex.

Table III exemplifies the fact that the addition of a suitable surfactant to the acid which is subsequently utilized to break the emulsion, as discussed hereinabove, greatly accelerates the action of the acid. Any hydrophyllic surfactant, compatible with the acid, may be used. Another example of a suitable surfactant is a combination of two surfactants commonly used in oil well acidizing—Halliburton Company HA1 45, corrosion inhibitor, and Pen 5, a wetting agent. This latter surfactant was used in the percentages indicated hereinabove to break the emulsions of Table II. Thus, Table III, shows that the time required for the acid (i.e., the HC1) to break the respective emulsion increases with the more stable emulsions. It was found that filter cakes were completely destroyed in times which varied from a few minutes for cakes of low stability emulsions to one hour for cakes made from the very stable emulsions.

TABLE II.—PROPERTIES OF TYPICAL CHALK EMULSIONS

Amounts to make 100 bbls. of emulsion

| | Diesel oil, bbl. | Water or brine,[1] bbl. | Acintol $FA_1$, gals. | Redicote $E_{11}$, gals. | Sluggits, lbs./bbl. | | | Density, lb./gal.[2] | Apparent visc., cp. | API fil. loss, cc./30 m. | Max. B.H. temp., °F. | Est. cost per bbl.[3] |
|---|---|---|---|---|---|---|---|---|---|---|---|---|
| | | | | | Micro | Fine | Med. | | | | | |
| *For Low Temperature* | | | | | | | | | | | | |
| 1 | 40 | 60 | 17 | 4 | 3 | 1.5 | 0 | 8 | 44 | 5.4 | 200 | $0.85 |
| *For Moderate Temperature* | | | | | | | | | | | | |
| 2 | 40 | 60 | 17 | 8 | 3 | 1.5 | 0 | 8 | 47 | 4 | 300 | $0.98 |
| *For Clay Contamination or High Temperature* | | | | | | | | | | | | |
| 3 | 39 | 60 | 34 | 16 | 3 | 1.5 | 0 | 8 | 49 | 4 | 400 | $1.33 |
| *For Low Density or Low Viscosity or to Get Oil Filtrate* | | | | | | | | | | | | |
| 4 | 59 | 40 | 26 | 4 | 3 | 1.5 | 0 | [4] 7.2 | 9 | 6.6 | 200 | $0.90 |
| *For High Density* | | | | | | | | | | | | |
| 5 | 59 | 40 | 50 | 8 | 350 lb./bbl. #10 white[5] | | | [7] 11.7 | 97 | 4 | 400 | $4.20 |
| *For High Viscosity* | | | | | | | | | | | | |
| 6 | 29 | 70 | 25 | 8 | 3 | 1.5 | 0 | 8.15 | 120 | 4 | 200 | $1.02 |
| *For Coarse, Highly Permeable Reservoir* [6] | | | | | | | | | | | | |
| 7 | 40 | 60 | 17 | 4 | 3 | 1.5 | 15 | 8 | 44 | 5.4 | 200 | $1.06 |

[1] Brine or formation water is used if reservoir is water-sensitive.
[2] Density of diesel oil .836; density of brine 1.037.
[3] Covers cost of Acintol $FA_1$, Redicote $E_{11}$ and carbonates only.
[4] Lower gravity oil is used to obtain lower densities.
[5] Increases volume of emulsion to 140 bbl. Cost of carbonate taken as 1.5¢/lb.
[6] Pills containing 15 lb./bbl. of each grade Sluggit are used to combat lost circulation.
[7] Maximum.

TABLE III.—EFFECT OF FORMULATION ON ACID REACTIVITY

Water phase all emulsions—6% NaCl
Acid, 15% HCl plus surfactants as shown
Temperature of air-bath 160° F.[1] except as shown

| Experiment number | Percent volume diesel oil | Acintol $FA_1$ as percent volume of diesel | Redicote $E_{11}$, percent | Sluggits, lb./bbl. | | Surfactants in acid | Mins. for 90% em. breakdown |
|---|---|---|---|---|---|---|---|
| | | | | Micro | Fine | | |
| 1 | 40 | 1 | .1 | 3 | 1.5 | .5% HA1 45 plus .2% Pen 5 | 20 |
| 2 | 40 | 1 | .1 | 16 | 1.5 | do | 11 |
| 3 | 40 | 1 | .2 | 3 | 1.5 | do | 37 |
| 4 | 40 | 2 | .1 | 3 | 1.5 | do | 90 |
| 5 | 40 | 2 | .2 | 3 | 1.5 | do | ~300 |
| 6 | 40 | 2 | .4 | 3 | 1.5 | do | ~300 |
| 7 | 60 | 1 | .1 | 3 | 1.5 | do | 55 |
| 8 | 60 | 2 | .4 | 3 | 1.5 | do | ~300 |
| 9 | 80 | 1 | .2 | 3 | 1.5 | do | 110 |
| 10 | 30 | 2 | .2 | 3 | 1.5 | do | 100 |
| 11 | 40 | 1 | .1 | 3 | [2] 1.5 | do | 60 |
| 12 | 40 | 1 | .1 | 3 | 1.5 | do | [3] 40 |

[1] Reactants took up to 45 minutes to reach temperature.
[2] Emulsion made with fresh water instead of 6% NaCl.
[3] At 75° F.

Table IV, hereinbelow, shows "mud" spurts obtained when the various emulsions were filtered against loose sandpacks of varying permeability. The obtained values are low considering the fluids involved contained very few bridging solids and these values may be compared with a value of 25 cc. obtained with a 2 pound per barrel suspension of HiLow gel containing the same amount of bridging solids.

wall of oil-sand-formation 11 but does not penetrate and thereby displace the resin 19 further into formation 11 (as would a conventional fluid, such as water). Such a temporary-plugging action is desirable where it is desired to consolidate only the portions of earth formation 11 adjacent to or on the face thereof. The slug of emulsion acts as a piston to displace the treating liquid into but not beyond the face of the formation 11. Typical treating TABLE IV.—STATIC FILTRATION PROPERTIES OF CHALK EMULSIONS ON SANDSTONES AND SAND PACKS 100 p.s.i. pressure

| Expt. No. | Diesel oil | Acintol percent $FA_1$ in diesel | Percent Redicote $E_{11}$ | Lb./bbl. Sluggits | | | Permeability, md. | Depth of mud spurt invasion, cm. | Filter loss cc./cm.$^2$ in 3 hrs. |
| | | | | Micro 20-<$2\mu$ | Fine 40-3$\mu$ | Med. 400-50$\mu$ | | | |
|---|---|---|---|---|---|---|---|---|---|
| Tests on Sand Packs at 23° C. | | | | | | | | | |
| 1 | 40 | 2 | .2 | 3 | 1.5 | 1.5 | 28,400 | 8.2 | .14 |
| 2 | 40 | 2 | .2 | 16 | 16 | 16 | 27,500 | 2.2 | .14 |
| 3 | | (.56% Bex)$^1$ | | 3 | 1.5 | 1.5 | 28,600 | 24 | .62 |
| 4 | | (.56% Bex) | | 16 | 16 | 16 | 35,300 | 11.6 | 1.9 |
| 5 | 40 | 2 | .2 | 3 | .15 | | ~5,000 | 3.1 | .14 |
| 6 | | (.56% Hi Low Gel)$^2$ | | 3 | 1.5 | | ~5,000 | 11 | .42 |
| Gilderhauzen Sandstone | | | | | | | | | |
| 7 | 40 | 2 | .2 | 3 | 1.5 | | 2,400 | 1.4 | .2 |
| Berea Sandstone Cores, Tests at 160° F. | | | | | | | | | |
| 8 | 40 | .1 | .1 | 3 | 1.5 | | 63 | .3 | .2 |
| 9 | | (1.5% Heal S)$^3$ | | 3 | 1.5 | | 35 | 1.4 | 2.2 |

$^1$ Bex is carboxy-ethyl-cellulose marketed by Chemical Additives, Houston.
$^2$ HiLow gel is a guar gum marketed by Sand Control, Inc., Lafayette.
$^3$ Heal S is an acid-soluble lignosulfonate marketed by Chemical Additives.

If desired, the viscosity of the foregoing emulsions may be raised by adding water plus the proportionate amount of Redicote $E_{11}$ and chalk, or the viscosity may be lowered by adding diesel oil plus the proportionate amount of tall oil and Redicote $E_{11}$.

Increasing the amount of chalk increases the stability and viscosity of the emulsion. The amount of chalk that may be incorporated in the emulsion is apparently limited only by the pumpability of the emulsion. The density of the emulsion may be controlled by varying the oil/water ratio, the salinity of the water phase and the amount of chalk. The use of highly saline brines may decrease the thermal stability of the emulsion but this may be offset by increasing the chalk content.

With the foregoing preferred combinations, the quantities of carbonates listed in Table II may be used with varying results. The choice of acid to be used with the various emulsions depends on the breaking time required. An acid of 15% HA is preferably used for formation acidification of emulsions containing surfactants of .5% HAl 45 and .2% Pen 5 which are commonly used by the Halliburton Company. There are many other suitable surfactants which may be used.

Although there is no one preferred emulsion, the emulsion used depending on the conditions encountered as set forth in Table II, the following is an example of one preferred emulsion:

TABLE V

| | Maximum concentration | Minimum concentration |
|---|---|---|
| Diesel oil | 80% | 30% by volume of total liquid phase. |
| Tall oil | 4% of oil phase | ½% by volume of oil phase. |
| $E_{11}$ | 1.5% of gross emulsion | 1/10 by volume of total liquid phase. |
| Carbonates | 400 lb./bbl | ½ lb./bbl. of total liquid phase. |

Figure 4:
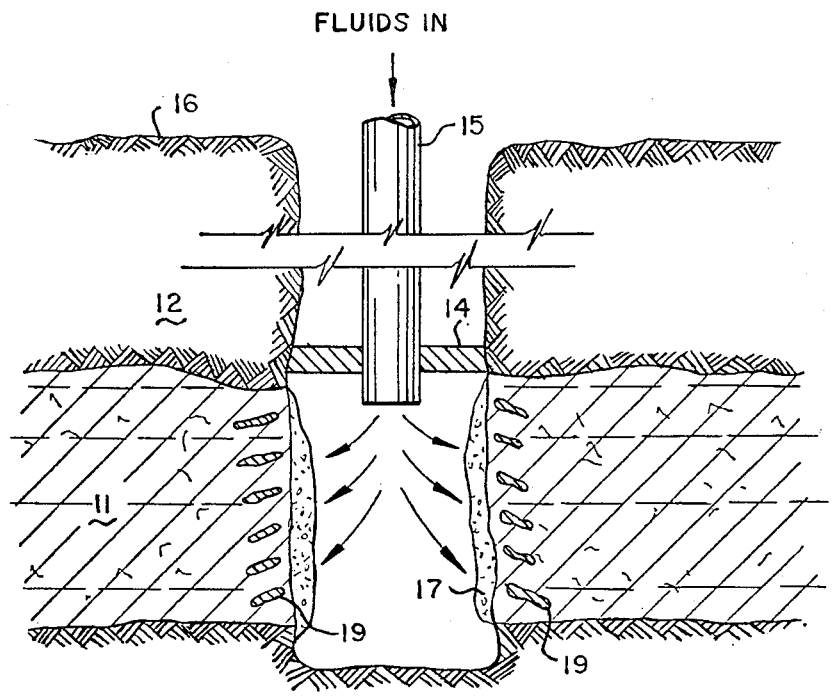
FIGS. 4 and 5 are vertical sectional views of further applications of the teachings of this invention applied to a permeable formation.

In addition to the well completion-fluid uses of this invention as disclosed hereinabove, the emulsion of this invention may be used to prevent the overdisplacement of earth formation-treating liquids. For example, as illustrated in FIG. 4 wherein like numerals to a like part of FIG. 3, a treating liquid, such s sand-consolidating resin 19, is shown disposed inwardly of oil-shale formation 11 only a short distance from the face thereof. The treating liquid is followed by a slug of the emulsion of this invention so that the emulsion forms filter cake 17 on the liquids, such as epoxy resins, and the manner of injecting such liquids are described in the following U.S. patents: 3,294,165; 3,294,166; 3,291,213; 3,368,625; 3,368,626; and 3,339,633.

Figure 5:
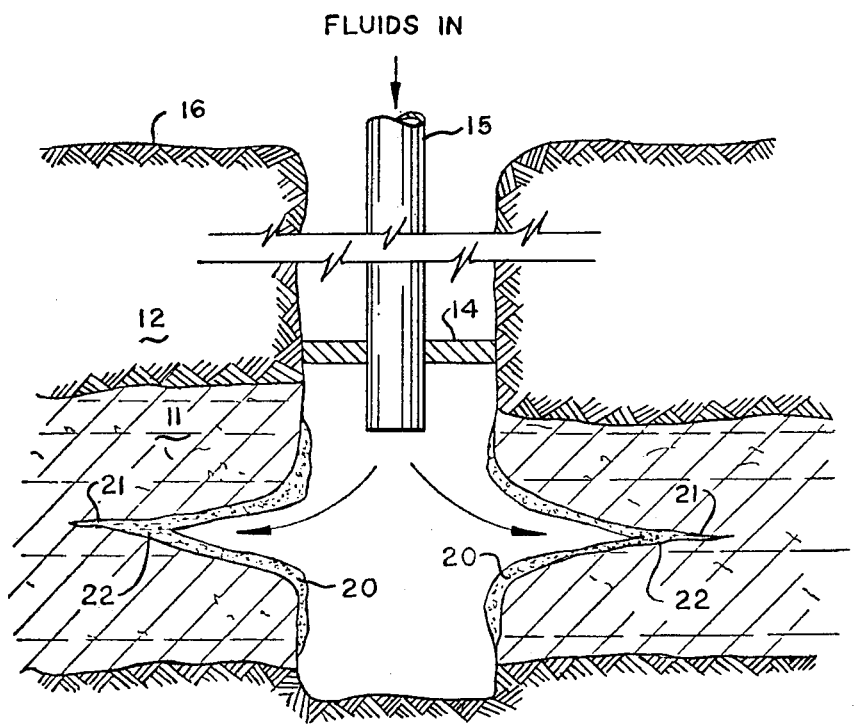

Referring now to FIG. 5, wherein like numerals again refer to like parts of FIG. 3, the emulsion of the present invention may be used in a fracturing operation to reduce the loss of fracturing fluid being used to hydraulically form and extend a fracture in a somewhat porous earth formation, such as formation 11.

Thus, as can be seen in FIG. 5, the injected emulsion forms a coating 20 which temporarily plugs the walls of the fracture 21 while fluid 22, which may be more of the emulsion, pumped from an external source (not shown) through fracture 21 to extend fracture 21 as is well known in the art.

In both cases, that is the displacing treatment of FIG. 4 and the fracturing treatment of FIG. 5, the solidified emulsion (i.e., filter cake 17 and coating 20, respectively) may be "broken down" and removed by injecting acid as discussed hereinabove with respect to the embodiment of FIGS. 1 through 3.

Equipment and techniques of the type used in conventional well-completion or fracturing operations may be used to displace the emulsion into contact with the portions of a formation, such as formation 11, to be temporarily plugged. In well-completion operations, this involved circulating the emulsion into borehole 13 so that it displaces the fluid that was previously present and becomes spotted adjacent to the formation 11 under a hydrostatic and/or pump-applied pressure providing a downhole pressure in the borehole fluid that exceeds the formation fluid pressure. The emulsion of the present invention may sometimes advantageously be used as the drilling fluid which is circulated during the drilling into the interval wherein borehole 13 is to be completed. In fracturing operations, such as illustrated in FIG. 5, the emulsion is simply injected into the fractures being formed or extended at a pressure sufficient to force the fluid into the earth formation.

The filter cakes of this invention may be removed by suitable means such as by use of any acidic, gaseous or liquid fluids. Where desirable, fluids may be backflowed from the portion of formation 11 that was contacted by the emulsion prior to contacting such portions with a pH-adjusting fluid. However, although such a backflowing removes at least the bulk of the filter cake and restores a significant portion of permeability, a substantially complete restoration of the natural permeability of formation 11 necessitates the contacting of the temporarily plugged portion of formation 11 with an acidic fluid as discussed hereinabove.

I claim as my invention:

1. A particle-stabilizing, water-in-oil emulsion of selected quiescent stability and acid-breaking properties, that consists essentially of:

a water-phase liquid dispersed within an oil-phase liquid with the oil-phase liquid amounting to from about 30 to 80% by volume of the total liquid phase; oil-wetting surfactant amine salts of higher fatty acids in the amount of from about ½ to 4% by volume of said oil-phase liquid; an interfacial tension lowering cationic amino or quaternary ammonium chloride surfactant in the amount of from about 0.1 to 1.5% by volume of the total liquid phase; the total amount of said surfactants being less than about 0.5 pound per barrel of emulsion and fine acid-soluble alkaline earth metal carbonate particles having a median diameter of not more than about two microns in the amount from about 0.5 to 400 pounds per barrel of total liquid phase; and said proportions being correlated within said ranges so that said emulsion is substantially stable for at least about six hours while quiescent at the temperature of a subterranean reservoir to be treated and said emulsion breaks to form a mixture of substantially undispersed oil-phase and water-phase liquids within about two hours after being contacted by sufficient acid to dissolve said acid-soluble particles.

2. The emulsion of claim 1 in which said carbonate particles are calcium carbonate particles.

3. The emulsion of claim 1 in which said carbonate particles are barium carbonate particles.

References Cited

UNITED STATES PATENTS

| | | | |
|---|---|---|---|
| 2,350,154 | 5/1944 | Dawson et al. | 252—8.5 |
| 2,702,787 | 2/1955 | Freeland | 252—8.5 |
| 2,689,219 | 9/1954 | Menaul | 252—8.5 |
| 2,797,196 | 6/1957 | Dunn et al. | 252—8.5 |
| 3,634,235 | 1/1972 | Wilson et al. | 252—8.5 |
| 3,057,797 | 10/1962 | Anderson et al. | 252—8.5 |
| 2,900,337 | 8/1959 | Earley et al. | 252—8.5 |
| 3,046,222 | 7/1962 | Phansalkar et al. | 252—8.55 |
| 3,099,624 | 7/1963 | Wilson | 252—8.5 |
| 2,999,063 | 9/1961 | Hoeppel | 252—8.5 |

HERBERT B. GUYNN, Primary Examiner

U.S. Cl. X.R.

252—8.5 P, 309